2 Sheets—Sheet 1.
F. W. RANDALL.
Grain-Binders.
No. 213,838. Patented April 1, 1879.
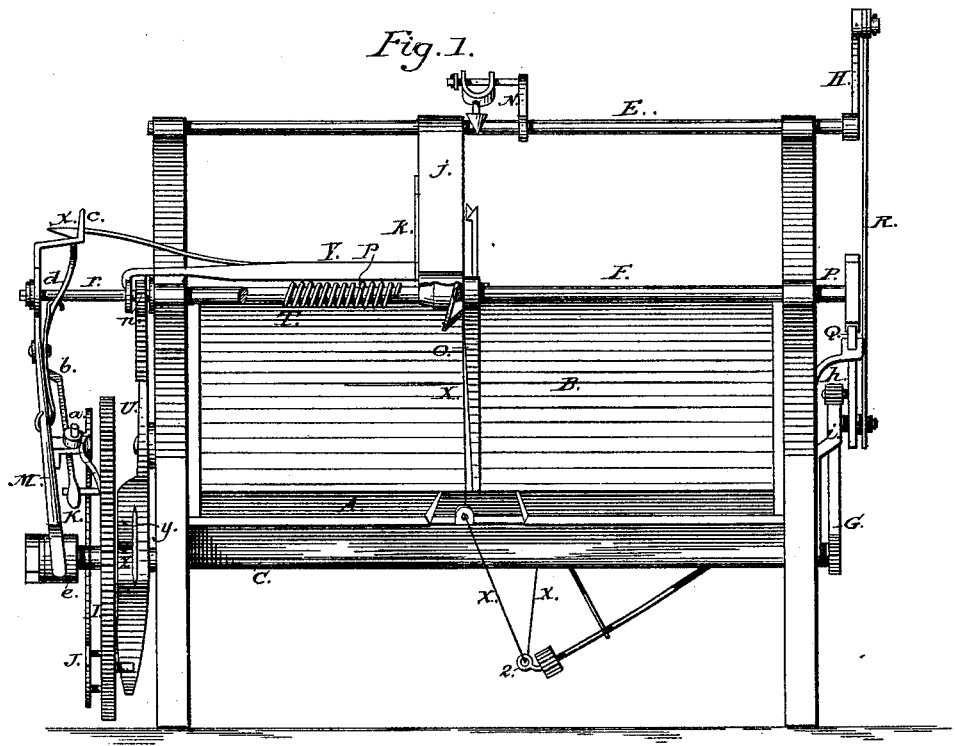
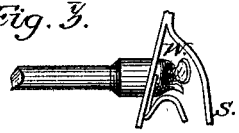
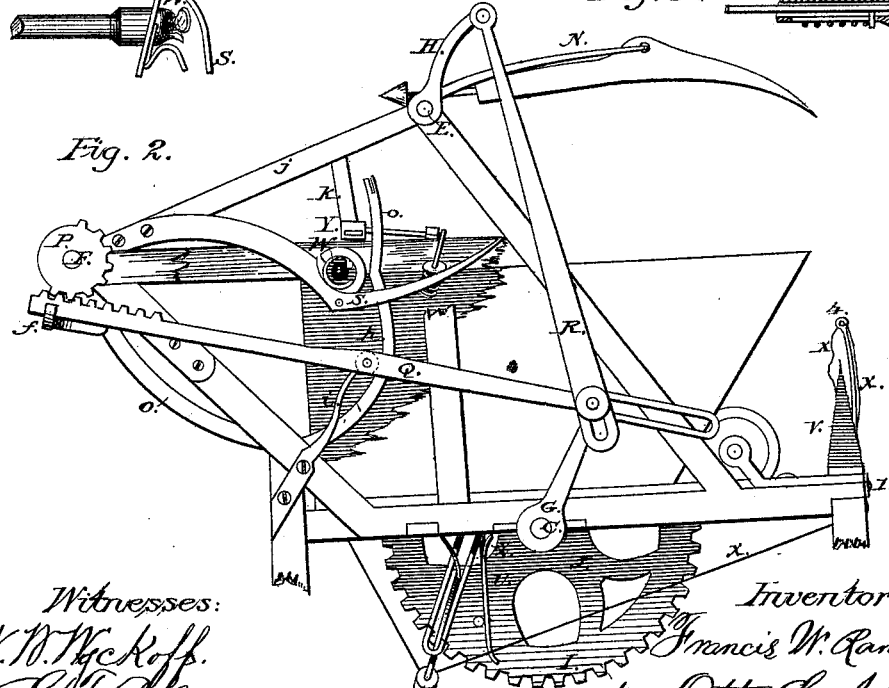
Witnesses:
W. W. Wyckoff
S. T. Palmer
Inventor:
Francis W. Randall
per Otto Lee Johnson
Atty.

F. W. RANDALL.
Grain-Binders.
No. 213,838. Patented April 1, 1879.
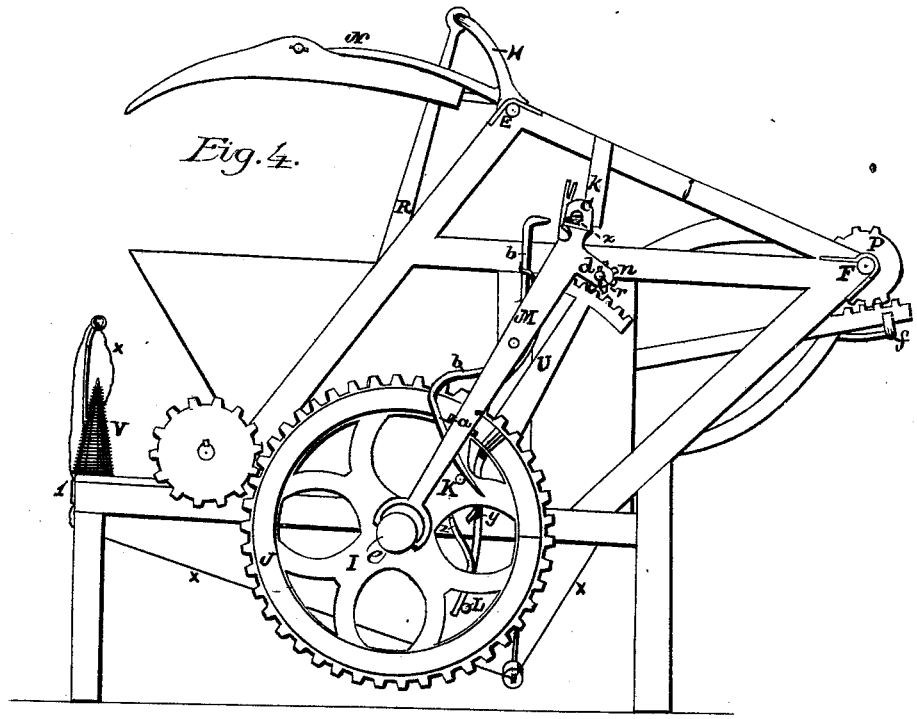
Fig. 4.
Fig. 5.
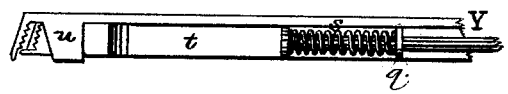
Fig. 6.
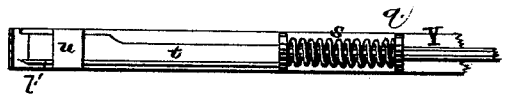
Witnesses:
W. N. Wyckoff.
L. T. Palmer.
Inventor:
Francis W. Randall, per
Otto Lee Johnson
Atty.

UNITED STATES PATENT OFFICE.

FRANCIS W. RANDALL, OF ST. PAUL, MINNESOTA.

IMPROVEMENT IN GRAIN-BINDERS.

Specification forming part of Letters Patent No. 213,838, dated April 1, 1879; application filed July 9, 1878.

*To all whom it may concern:*

Be it known that I, FRANCIS W. RANDALL, of St. Paul, in the county of Ramsey and State of Minnesota, have invented certain new and useful Improvements in Twine Grain-Binders; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention relates to an improved twine grain-binder for that class of harvesters which elevate the grain; and it consists principally in a conical bobbin on which the twine is wound; also, what I term a "grabber," for cutting and holding the twine, and such other details of construction and arrangement of parts as will be hereinafter described.

In the drawings, Figure 1 represents a side elevation of my invention. Figs. 2 and 4 are end elevations. Fig. 3 is a detail of cylinder and hook-rod T. Fig. $3^2$ is a vertical section through cylinder T. Fig. 5 represents a plan view, and Fig. 6 a side elevation, of grabber.

A rod (not shown in the drawings) couples or connects the frame of my improved binder to the frame of the harvester at a point beneath the straw-carrier, and by a lever within easy reach of the driver the attachment is thrown in and out of gear, and the size of the bundle is regulated when required.

In the drawings the several parts of the machine are represented in relation to one another as they are just before the operation of binding a bundle has begun.

The frame of the machine may be made as shown in Figs. 1 and 2, or in any other suitable shape, with a somewhat sloping grain-table A, and end B. The main driving-shaft C and shafts E and F extend across and are journaled in suitable boxes in the frame. G is a crank, keyed to the forward end of the main driving-shaft C. To the rear end of said shaft, outside of the frame, is keyed the cog-wheel I. Said wheel is provided with a circular track, J, and studs K and L. M is what I term a "swing-bar," carrying an anti-friction roller, $a$, and lever $b$. $c$ and $d$ are arms on the upper ends of the swing-bar M, the lower end of which is pivoted to a collar, $e$, on the end of the shaft C. Near the center of the shaft E is keyed the pivoted gathering-arm N, and to the forward end of said shaft is keyed the crank H. Near the center of the shaft F I key the U-shaped gathering-arm O. To the forward end of said shaft is keyed the segmental wheel P. $f$ is an arm, holding in gear the segmental wheel P and a rack formed on the end of the slotted pitman Q, which is connected with the crank G on the main driving-shaft. R is a slotted pitman, connecting the cranks G and H. On the slotted pitman Q is fastened the anti-friction roller $h$, working on the under side of the compound curved track $i$. Bolted to a brace, $j$, connecting the shafts E and F, is what I term a "forked head," S, of peculiar shape, as shown in Fig. 2, with the ends of the fork welded together, forming a V-shaped head, for the purpose of opening the pivoted gathering-arm N.

U is what I term a "segmental swing-bar," pivoted near its center to the rear end of the machine. The lower end is provided with flanges $y$ and $z$, and otherwise bent or curved, as shown in Fig. 4. The cylinder T, which carries the knot-tier W on its forward end, is rotated by the pinion $n$ on its rear end, engaging with said swing-bar U. $p$ is a spiral spring on the cylinder T, engaging with the shoulder $q$ on the hook-rod $r$, said rod extending the whole length of the cylinder, and being connected to the arm $d$ of the swing-bar M.

What I term the "grabber" Y is a metal arm, situated above the cylinder T, and is composed of a V-shaped head, $u$, and sliding jaw $t$, operated by coil-spring $s$, as shown in Figs. 5 and 6, and said grabber extends from a point above the knot-tier to the rear end of the machine, where it is hinged to the top of the frame. An arm and spiral spring hold said grabber Y in contact with the stop $k$ on brace $j$. The sliding jaw is usually lengthened out and provided with a hook, $x$, which engages with a hook on the lever $b$. On the conical-shaped bobbin V, fastened at any convenient point to the frame of the machine, is wound the binding-cord X, which, in threading the machine, is first passed through an overhanging eye, 4, thence under the tension-spring 1, thence through an eye in the weight 2 and plate 3, up to and into the V-shaped opening in the head of the grabber Y.

Having thus described the construction and arrangement of the several parts, I come to a description of its operation, which is as follows: The crank G, moving in the direction of the arrow, carries back the slotted pitman Q, causing the segmental wheel to turn forward, carrying back the U-shaped arm O. The pivoted gathering-arm N is now moved downward by the operation of the slotted pitman R and crank H on the shaft E, gathering the bundle and carrying it forward to the binding-cord X. At the same time this arm is spread apart by being carried onto the forked head S, thereby forming a better support for the bundle. The crank G, having now reached the end of the slot in the end of the pitman Q, reverses the motion previously described, carrying forward the U-shaped arm O, the head of which strikes the binding-cord, carrying it up around the bundle previously formed, and sliding the bundle up on the pivoted gathering-arm N to the knot-tier, placing said binding-cord in the grabber and knot-tier. At this period in the operation the anti-friction-roller a on the swing-bar M drops off the circular track J, allowing the spring p on the cylinder T to throw the hook-rod forward, inclosing both strands of the binding-cord in the knot-tier. The stud L on the cog-wheel I, striking against the flange of the segmental swing-bar U, moves the swing-bar up, causing the knot-tier to turn, catching the binding-cord X on the horn of the knot-tier. As the knot-tier revolves, the binding-cord next to the bundle is carried up, so that as the knot-tier revolves it is pulled off from the large horn of the knot-tier and both cords again enter the knot-tier. At this point in the operation the stud K strikes the flange on the swing-bar M, reversing the motion of the knot-tier. After the knot-tier has revolved about half-way round in this direction the anti-friction roller strikes the raised portion of the track J, drawing the binding-cord, which has just passed within the hook on the end of the hook-rod r, through the loop previously formed by the binding-cords being wound around the hook-rod r and over the smaller horn of the knot-tier, said loop being drawn within the cylinder. At this point in the operation the grabber is opened, and the end of the binding-cord passes within the head of the grabber. The lever b on the swing-bar M strikes the stud K, throwing the hooked point of the lever forward, releasing the sliding jaw, when the knife l cuts the binding-cord, retaining one end in the grabber, when the bundle is released and falls to the ground.

Having thus described the construction and operation of my invention, I claim as new and useful—

In a grain-binding machine, the main driving-shaft C, crank G, cog-wheel I, track J, studs K and L, segmental swing-bar U, flanges y and z, swing-bar M, lever b, and spring p, in combination with the hook-rod r, pinion n, cylinder T, spring s, forked head S, grabber Y, and knot-tier W.

In testimony that I claim the foregoing as my own I affix my signature in presence of two witnesses.

FRANCIS W. RANDALL.

Witnesses:
JOHN M. WHEELER,
O. S. ST. JOHN.